(No Model.)

W. A. JORDAN.
NUT LOCK.

No. 389,843. Patented Sept. 18, 1888.

Witnesses:

Inventor:
W. A. Jordan.

Attorney.

N. PETERS, Photo-Lithographer, Washington, D. C.

UNITED STATES PATENT OFFICE.

WILLIAM ALEXANDER JORDAN, OF NEW ORLEANS, LOUISIANA.

NUT-LOCK.

SPECIFICATION forming part of Letters Patent No. 389,843, dated September 18, 1888.

Application filed March 20, 1888. Serial No. 267,902. (No model.)

*To all whom it may concern:*

Be it known that I, WILLIAM ALEXANDER JORDAN, a citizen of the United States, residing at New Orleans, in the parish of Orleans and State of Louisiana, have invented certain new and useful Improvements in Nut-Locks; and I do declare the following to be a full, clear, and exact description of the invention, such as will enable others skilled in the art to which it appertains to make and use the same.

My invention relates to improvements in nut-locks, in which an eccentric-grooved bolt is made to operate in conjunction with a key-pin; and the objects of my improvements are to provide a bolt for fish-bars of railroad-tracks and bridge-timbers that will keep the nut on bolt in a positive position. I attain these objects by the mechanism illustrated in the accompanying drawings, in which—

Figure 1:
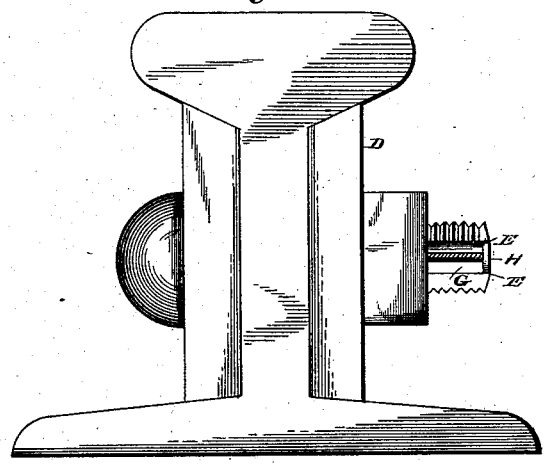
Figure 2:
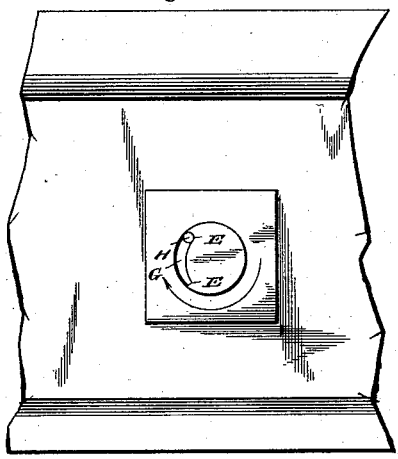
Figure 3:
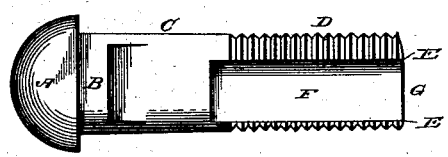
Figure 4:
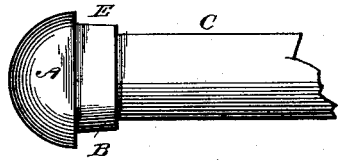
Figure 5:
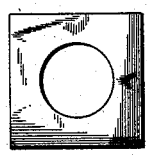
Figure 6:
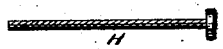
Figure 7:
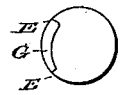
Figure 7:
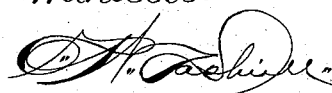
Figure 7:
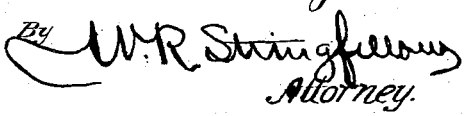

Figure 1 is an end view showing device in position. Fig. 2 is a side elevation. Figs. 3 and 4 are detailed views of bolt. Fig. 5 is a front elevation of nut. Fig. 6 is a view of the key or locking-pin. Fig. 7 is an end view of bolt, similar letters referring to similar parts throughout the several views.

In constructing my device I use a bolt similar to such as are in use on railroads, consisting of the head A, shoulders B, shank C, and threads D. On the side of bolt I place an eccentric groove with surface as shown at F, said groove extending beyond the inner threaded end of same, as shown in Fig. 3, and terminating at end of bolt, as shown by G, E being a shoulder of groove. I also use a nut, as shown in Fig. 5, with threads therein that will enable nut to work properly on bolt. Key-pin H, as shown in Fig. 6, is an ordinary barbed-wire nail, which I place in groove of bolt when nut is upon bolt, and which, with nut, forms a combination-lock that prevents nut from loosening.

I do not confine myself to any particular device for a key-pin, as an ordinary nail, spike, or bolt may be used; or, if preferable, two strands of wire twisted will form a desirable key-pin, as a barbed or corrugated surface on key-pin is preferable in order that threads on nut can more readily grasp on same. Where head is used on key-pin, as shown in Fig. 6, it is made flat and protrudes beyond threaded end of bolt, as shown in Fig. 2, enabling key-pin to be readily adjusted by means of the head.

In operating my device I insert bolt through fish-bars and body of rail, as shown in Fig. 2, adjust nut on end of bolt, placing same as close against fish-bar as possible, and to form a lock I then insert in groove of bolt my key-pin, which forms a lock and prevents nut loosening. Should the nut become loose from contraction of metal or other causes, which is often the case, a slight turn of the nut to the right with a wrench forces the key-pin to roll up against shoulder E at the deepest portion of the groove until a secure fastening or lock is made, when key-pin will roll back by its own gravity to its proper place.

A striking advantage of my device is in the eccentric groove and key-pin, by which a nut may be effectually locked to a bolt on a railway-track or upon bridge-timbers in a simple manner.

I am aware that it is not new in friction-clutches for machinery to provide a shaft with a groove having a rounded or cam surface, and to place in said groove a round pin or key, so that a wheel placed upon the shaft may be prevented from backward movement, and therefore do not claim such devices, broadly; but, Having fully described my invention, what I claim, and desire to secure by Letters Patent of the United States, is—

The combination, in a railway nut-lock, of a threaded and headed bolt having shoulders, as described, and a groove arranged longitudinally in its threaded portion, and having a rounded or cam surface, an internally-threaded nut, and a key-pin arranged in the said groove of the bolt and within the nut, substantially as specified.

In testimony whereof I affix my signature in presence of two witnesses.

WILLIAM ALEXANDER JORDAN.

Witnesses:
 JOSEPH DEVONSHIRE,
 PERCY D. PARK.